United States Patent [19]

Kagami et al.

[11] 4,278,913

[45] Jul. 14, 1981

[54] PHOSPHOR AND LOW-VELOCITY ELECTRON EXCITED FLUORESCENT DISPLAY DEVICE UTILIZING THE SAME

[75] Inventors: Akiyasu Kagami, Ninomiya; Yoshiyuki Mimura, Chigasaki, both of Japan

[73] Assignees: Kasei Optonix, Ltd.; Japan Electric Industry Development Assoc., both of Tokyo, Japan

[21] Appl. No.: 77,377

[22] Filed: Sep. 20, 1979

[30] Foreign Application Priority Data

Sep. 20, 1978 [JP] Japan .................................. 53-115676

[51] Int. Cl.$^3$ .................... C09K 11/46; H01J 63/04
[52] U.S. Cl. ............................. 313/495; 252/301.6 R; 252/301.6 F
[58] Field of Search ................... 252/301.6 R, 301.6 F; 313/495, 496

[56] References Cited

U.S. PATENT DOCUMENTS

| | | | |
|---|---|---|---|
| 2,628,201 | 2/1953 | Smith | 252/301.6 R |
| 2,683,693 | 7/1954 | Celmer | 252/301.6 R |
| 2,806,002 | 9/1957 | Smith | 252/301.6 R |
| 2,921,201 | 1/1960 | Lieb | 252/301.6 R X |
| 3,294,701 | 12/1966 | Vogel et al. | 252/301.6 R |
| 3,583,928 | 6/1971 | Lehmann | 252/301.6 R |
| 4,119,462 | 10/1978 | Kagami et al. | 252/301.6 R X |

FOREIGN PATENT DOCUMENTS 52-12686  1/1977  Japan ................................ 252/301.6 R

*Primary Examiner*—Jack Cooper

[57] ABSTRACT

A zinc oxide-based phosphor represented by the following formula emits yellow light of high luminance under excitation of low-velocity electrons:

$$xM^{II}F_2 \cdot yM^{III}F_3 \cdot ZnO$$

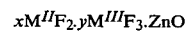

wherein $M^{II}$ is at least one divalent metal selected from the group consisting of beryllium, magnesium, calcium, strontium, barium, zinc and tin, $M^{III}$ is at least one trivalent metal selected from the group consisting of aluminum, gallium, indium, thallium, yttrium and antimony, and x and y are numbers satisfying the conditions of $0.0001 \leq x+y \leq 0.1$, $0 \leq x$ and $0 < y$. The zinc oxide-based phosphor is used as a fluorescent screen of a low-velocity electron excited fluorescent display device.

4 Claims, 4 Drawing Figures

PHOSPHOR AND LOW-VELOCITY ELECTRON EXCITED FLUORESCENT DISPLAY DEVICE UTILIZING THE SAME

BACKGROUND OF THE INVENTION

1. Field of the Invention

This invention relates to a yellow emitting phosphor and a low-velocity electron excited fluorescent display device utilizing the same, and more particularly relates to a yellow emitting zinc oxide-based phosphor and a low-velocity electron excited fluorescent display device containing the phosphor as a fluorescent screen.

2. Description of the Prior Art

As a phosphor which emits light of high luminance under excitation of low-velocity electrons, a zinc oxide phosphor (ZnO) has been commonly known. The ZnO phosphor can be prepared by firing ZnO raw powder alone in a reducing atmosphere, or by firing in the air ZnO raw powder contaminated with an extremely small amount of zinc compound other than ZnO such as zinc sulfide (ZnS) or the like, and the ZnO phosphor emits green light of high luminance when excited by low-velocity electrons. The low-velocity electron excited fluorescent display devices having the fluorescent screen comprising the aforesaid ZnO phosphor have been practically used as display devices for, e.g., desk top and portable electronic calculators and various kinds of measuring instruments.

As is well known, a low-velocity electron excited fluorescent display device (hereinafter referred to as "fluorescent display device") in general has a fundamental structure such that both an anodic plate having a fluorescent screen on one side thereof and a cathode standing face to face with the above-described fluorescent screen are enclosed in an evacuated tube. The fluorescent screen applied on the anodic plate emits light when excited by low-velocity electrons emitted from the cathode. Both FIGS. 1 and 2 schematically show the typical structures of fluorescent display devices, and they show a diode type display tube and a triode type display tube, respectively. As shown in both FIGS. 1 and 2, one side of an anodic plate 11 made of, for example, an aluminum plate, has a fluorescent screen 12 thereon. The other side of the anodic plate 11 is supported by a ceramic base plate 13. The diode type display tube is equipped with a cathode standing face to face with the above-described fluorescent screen 12 placed on the anodic plate 11, and the fluorescent screen 12 is excited by low-velocity electrons emitted from the cathode 14 and emits light. In particular, the triode type display tube shown in FIG. 2 additionally has a grid electrode 15 between the cathode 14 and the fluorescent screen 12 so as to control or diverge the low-velocity electrons emitted from the cathode 14. Moreover, when the surface of the fluorescent screen 12 has a wide area, two or more cathodes may be additionally provided in both fluorescent display tubes shown in FIGS. 1 and 2 wherein only one cathode is provided, and there is no particular limit to the number of cathodes that can be provided therein. The aforesaid anodic plate 11 having the fluorescent screen 12 on one side thereof, the ceramic base plate 13 and the cathode 14 (which are shown in FIG. 1), or the aforesaid anodic plate 11 having the fluorescent screen 12 on one side thereof, the ceramic base plate 13, the cathode 14 and the grid electrode 15 (which are shown in FIG. 2) are enclosed in a transparent container 16 made of, for example, glass, the pressure within which is held at a high vacuum of $10^{-5}$ to $10^{-9}$ Torr.

Although, as is described above, the green emitting ZnO phosphor has been commonly known as a phosphor which emits light of high luminance under excitation of low-velocity electrons, and the fluorescent display device having the above-mentioned fundamental structure and having the fluorescent screen comprising the ZnO phosphor has been practically used as a green emitting display device, there is an increasing demand for phosphors which can emit light of high luminance other than green light under excitation of low-velocity electrons in order to meet the increasing practical use of fluorescent display devices.

As phosphors which can emit light of high luminance other than green light under excitation of low-velocity electrons, red or blue emitting fluorescent compositions comprising a mechanical mixture of indium oxide ($In_2O_3$) or zinc oxide (ZnO) and a red or blue emitting phosphor have heretofore been known (Japanese Patent Publication Nos. 23916/1977 and 23911/1977, and Japanese Patent Application Laid Open Nos. 145479/1976 and 115787/1977). In these fluorescent compositions, the emission efficiency of the phosphor under excitation of low-velocity electrons is markedly elevated by the conductive material mixed therewith. However, differently from the fluorescent compositions as described above a phosphor which can solely emit light of high luminance other than green light under excitation of low-velocity electrons has heretofore hardly been known.

SUMMARY OF THE INVENTION

Therefore, an object of the present invention is to provide a phosphor which can emit light of high luminance other than green light under excitation of low-velocity electrons.

Another object of the present invention is to provide a fluorescent display device which can emit light of high luminance other than green light.

In order to accomplish the above-mentioned objects, the inventors of the present invention conducted various investigations in the phosphor comprising ZnO and another compound or other compounds. As the result of the investigations, it was found that the phosphor comprising ZnO and a trivalent metal fluoride, or ZnO, a divalent metal fluoride and a trivalent metal fluoride emitted yellow light of high luminance under excitation of low-velocity electrons.

The phosphor of the present invention is a zinc oxide-based phosphor represented by the formula

$$xM^{II}F_2.yM^{III}F_3.ZnO$$

wherein $M^{II}$ is at least one divalent metal selected from the group consisting of beryllium, magnesium, calcium, strontium, barium, zinc and tin, $M^{III}$ is at least one trivalent metal selected from the group consisting of aluminum, gallium, indium, thallium yttrium and antimony, and x and y are numbers satisfying the conditions of $0.0001 \leq x+y \leq 0.1$, $0 \leq x$ and $0 < y$.

Further, the fluorescent display device of the present invention uses the above-mentioned zinc oxide-based phosphor of the present invention as a component of a fluorescent screen.

DETAILED DESCRIPTION OF THE INVENTION

Figure 1:
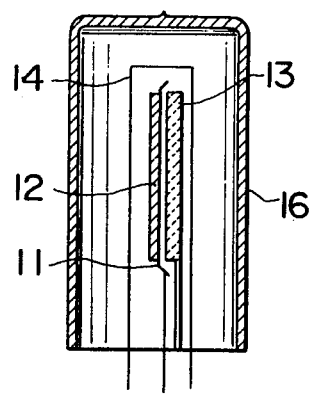
FIG. 1 and FIG. 2 schematically show the structure of typical examples of fluorescent display devices, wherein a diode type display tube is shown in FIG. 1 and a triode type display tube is shown in FIG. 2.

The present invention will be described in detail hereinbelow.

The zinc oxide-based phosphor of the present invention is prepared by the following process.

The following raw materials are used:

(i) at least one zinc compound selected from the group consisting of ZnO and zinc compounds which are easily alterable to ZnO at a high temperature such as carbonate, sulfate, oxalate, hydroxide, and the like, (ii) at least one fluoride selected from the group consisting of beryllium fluoride (BeF$_2$), magnesium fluoride (MgF$_2$), calcium fluoride (CaF$_2$), strontium fluoride (SrF$_2$), barium fluoride (BaF$_2$), zinc fluoride (ZnF$_2$), tin fluoride (SnF$_2$) and fluorides which are easily alterable to BaF$_2$, MgF$_2$, CaF$_2$, SrF$_2$, BaF$_2$, ZnF$_2$ or SnF$_2$ at a high temperature such as beryllium silicofluoride (BeSiF$_6$), magnesium silicofluoride (MgSiF$_6$), calcium silicofluoride (CaSiF$_6$), strontium silicofluoride (SrSiF$_6$), barium silicofluoride (BaSiF$_6$), zinc silicofluoride (ZnSiF$_6$), and the like, and (iii) at least one trivalent metal fluoride selected from the group consisting of aluminum fluoride (AlF$_3$), gallium fluoride (GaF$_3$), indium fluoride (InF$_3$), thallium fluoride (TlF$_3$), yttrium fluoride (YF$_3$) and antimony fluoride (SbF$_3$).

The aforesaid raw materials (i), (ii) and (iii) are weighed out and mixed well by means of a mortar, a ball mill, a mixer mill, or the like to obtain a raw material mixture stoichiometrically represented by the formula

$x\text{M}^{II}\text{F}_2.y\text{M}^{III}\text{F}_3.\text{ZnO}$ wherein M$^{II}$ is at least one divalent metal selected from the group consisting of beryllium, magnesium, calcium, strontium, barium, zinc and tin, M$^{III}$ is at least one trivalent metal selected from the group consisting of aluminum, gallium, indium, thallium, yttrium and antimony, and x and y are numbers satisfying the conditions of $0.0001 \leq x+y \leq 0.1$, $0 \leq x$ and $0 < y$. The (x+y) value of the aforesaid formula is preferably within the range of $0.001 \leq x+y \leq 0.03$ from the viewpoint of the luminance of emission of the phosphor obtained. It is needless to say that when the phosphor does not contain a divalent metal fluoride as a component thereof, that is, when $x = 0$, the aforesaid raw material (ii) is not used.

Then, the aforesaid raw material mixture is put into a heat resistant container such as a quartz crucible, an alumina crucible, or the like, and fired in the air. The firing is performed at a temperature within the range of 700° to 1200° C. When the firing is performed at a temperature lower than 700° C., a reaction does not sufficiently take place and therefore, a phosphor which emits light of high luminance is not obtained. On the other hand, when the firing is performed at a temperature higher than 1200° C., the fired product is sintered and therefore, a phosphor which emits light of high luminance is not obtained, either. The firing temperature is preferably within the range of 850° to 1050° C. from the viewpoint of luminance of emission of the phosphor obtained. Although the firing period is determined depending on the amount of the raw material mixture, the firing temperature and so forth, the firing period is generally not shorter than 30 minutes, preferably within the range of 1 to 3 hours. The above-mentioned firing treatment may be repeated.

After the firing, the fired product is subjected to the processes generally employed in the production of phosphor, such as washing, drying, sieving and so forth to obtain the zinc oxide-based phosphor of the present invention.

By the above-mentioned process, the zinc oxide-based phosphor of the present invention represented by the following formula can be obtained:

$x\text{M}^{II}\text{F}_2.y\text{M}^{III}\text{F}_3.\text{ZnO}$ wherein M$^{II}$ is at least one divalent metal selected from the group consisting of beryllium, magnesium, calcium, strontium, barium, zinc and tin, M$^{III}$ is at least one trivalent metal selected from the group consisting of aluminum, gallium, indium, thallium, yttrium and antimony, and x and y are numbers satisfying the conditions of $0.0001 \leq x+y \leq 0.1$, $0 \leq x$ and $0 < y$.

Figure 3:
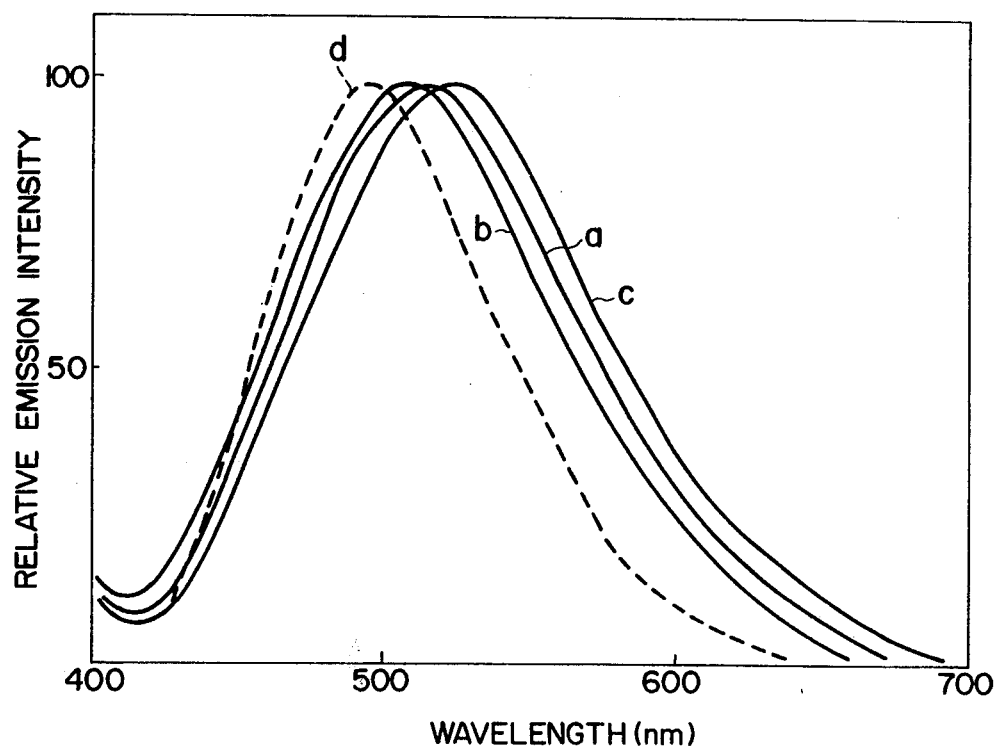
FIG. 3 is a graph showing the emission spectra of both the zinc oxide-based phosphors of the present invention and the conventional ZnO phosphor, wherein curves a, b and c are of the 0.003InF$_3$.ZnO phosphor, 0.0015SrF$_2$.0.0015InF$_3$.ZnO and 0.0015SnF$_2$.0.0015InF$_3$.ZnO phosphor of the present invention, respectively, and curve d is of the conventional ZnO phosphor.

As is clear from Tables 1 and 2 of the examples described hereinbelow, the zinc oxide-based phosphor of the present invention emits light of high luminance under excitation of low-velocity electrons, particularly low-velocity electrons induced by an acceleration potential of not more than 100 volts, and the color of light emitted thereby is yellow as shown in FIG. 3. FIG. 3 is a graph showing the emission spectra of the zinc oxide-based phosphors of the present invention and the conventional ZnO phosphor. In the graph, curves a, b and c are the emission spectra of the 0.003InF$_3$.ZnO phosphor, 0.0015SrF$_2$.0.0015InF$_3$.ZnO phosphor and 0.0015SnF$_2$.0.0015InF$_3$.ZnO phosphor of the present invention, respectively, and curve d is the emission spectrum of the ZnO phosphor.

As is clear from the comparison of curves a, b and c with curve d, the emission peak of the zinc oxide-based phosphors of the present invention shifts considerably to the longer wavelength side from that of the ZnO phosphor, and the emission color thereof is yellow differently from that of the ZnO phosphor. Although FIG. 3 is a graph showing the emission spectra of the aforesaid three kinds of zinc oxide-based phosphors of the present invention, it was confirmed that the emission peak of other zinc oxide-based phosphors of the present invention also shifted considerably to the longer wavelength side from that of the ZnO phosphor, and the emission color thereof was yellow.

Figure 4:
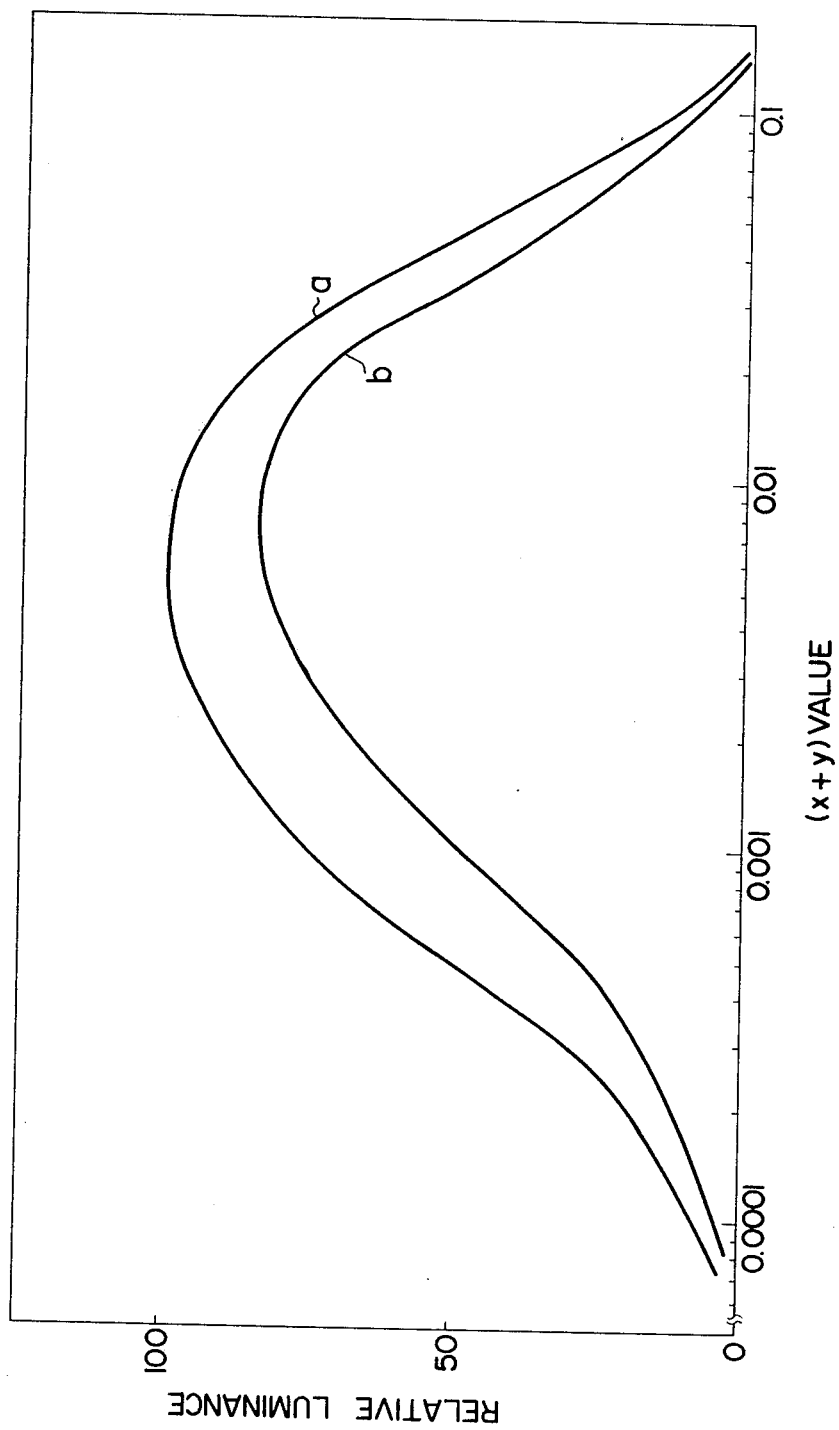
FIG. 4 is a graph showing the relationships between the (x+y) value and the luminance of emission under excitation of low-velocity electrons in the $x$SrF$_2$.$y$InF$_3$.ZnO phosphor of the present invention wherein curves a and b are of the cases in which $x \neq 0$ and $x = 0$, respectively.

FIG. 4 is a graph showing the relationships between the (x+y) value, that is, the sum of numbers of moles of SrF$_2$ and InF$_3$ in respect to one mole of ZnO and the luminance of emission under excitation of low-velocity electrons induced by an acceleration potential of 30 volts in the $x$SrF$_2$.$y$InF$_3$.ZnO phosphor of the present invention. In the graph, curve a is the relationship in the case wherein $x \neq 0$ and the molar ratio of SrF$_2$ to InF$_3$ ($x/y$) is 1, and curve b is the relationship in the case wherein $x=0$, that is, curve b is the relationship between y value (number of moles of InF$_3$ in respect to one mole of ZnO) and the luminance of emission. As is clear from FIG. 4, in both the cases wherein $x \neq 0$ and $x=0$, the luminance of emission markedly lowers when the $(x+y)$ value is smaller than 0.0001 and when the $(x+y)$ value is larger than 0.1, and particularly high luminance of emission is obtained when the $(x+y)$ value is within the range of $0.001 \leq x+y \leq 0.03$. Further, it was found that when $x \neq 0$, the $x/y$ value was preferably within the range of $\frac{1}{4}$ to 4 from the viewpoint of the luminance of emission of the phosphor obtained, and when the $x/y$ value was about 1 such as curve a, particularly high luminance of emission was obtained. Although FIG. 4 is the graph concerning the $x$SrF$_2$.$y$InF$_3$.ZnO phosphor of the present invention, similar results were obtained in the phosphors of the present invention other than the $x$SrF$_2$.$y$InF$_3$.ZnO phosphor.

As is mentioned above, the zinc oxide-based phosphor of the present invention emits yellow light of high luminance under excitation of low-velocity electrons. Among the phosphors of the present invention, the $y$InF$_3$.ZnO phosphor, $y$GaF$_3$.ZnO phosphor, $y$YF$_3$.ZnO phosphor, $x$SrF$_2$.$y$InF$_3$.ZnO phosphor, $x$SnF$_2$.$y$InF$_3$.ZnO phosphor, $x$SrF$_2$.$y$YF$_3$.ZnO phosphor and $x$SrF$_2$.$y$GaF$_3$.ZnO phosphor emit light of higher luminance than the others, and in particular, the $x$SrF$_2$.$y$InF$_3$.ZnO phosphor emits light of markedly high luminance. Further, the zinc oxide-based phosphor of the present invention also emits yellow light of high luminance under excitation of energy other than low-velocity electrons such as high-velocity electrons, ultraviolet rays, or the like. Accordingly, it is needless to say that the use of the zinc oxide-based phosphor of the present invention is not limited to one in which the phosphor is excited by low-velocity electrons.

The fluorescent display device of the present invention will be described hereinbelow.

The fluorescent display device of the present invention is manufactured in accordance with the following process.

First, an anodic plate supported by a conventional ceramic base plate is coated with the above-mentioned zinc oxide-based phosphor of the present invention in accordance with the sedimentation coating method in order to make a fluorescent screen. That is, an anodic plate is placed in an aqueous dispersion of the phosphor and the phosphor is allowed to deposit on one side of the anodic plate as it settles by gravity, and then, the water is removed from the aqueous dispersion. The resulting coating is then dried. In such a process, a small amount of water glass (about 0.01 to about 0.1%) may be added to the aforesaid dispersion for the purpose of increasing the degree of adhesion of the resulting fluorescent screen to the anodic plate. The preferred amount of the phosphor applied to the anodic plate is within the range of 3 to 30 mg/cm$^2$.

The above-mentioned sedimentation coating method has been commonly and widely applied in making fluorescent screens. However, the method for making a fluorescent screen in accordance with the present invention is not to be interpreted as being limited to the above-mentioned sedimentation coating method.

Next, a cathode made of a wire-heater covered with an oxide such as BaO, SrO, CaO, or the like is provided opposite to the fluorescent screen on the anodic plate at an interval of about 1 to 5 mm, and then, the resulting pair of electrodes is put in a transparent container made of glass, or the like and the container is evacuated. After the pressure inside the container reaches a pressure of $10^{-5}$ Torr or less, the evacuation is stopped and the resulting pressure is further lowered by sputtering a getter. In accordance with the process described above, the fluorescent display device can be obtained.

Figure 2:
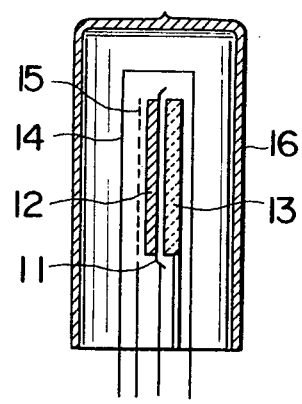

Further, as shown in FIG. 2, it is desirable to provide a mesh-like control grid between the cathode and the fluorescent screen as a diverging electrode. Such an electrode is useful in diverging low-velocity electrons emitted from the cathode because the fluorescent screen on the anodic plate is flat while the cathode is a wire. In this case, better results are attained by using as fine as possible a mesh since a smaller mesh results in a smaller loss in emission of the fluorescent screen with better efficiency in the divergence of low-velocity electrons. Specifically, meshes of below 500 micron and having an aperture ratio of not less than 50% are preferred (where the aperture ratio refers to the area of the holes capable of passing low-velocity electrons divided by the total area of the grid). A character, number or pattern can be displayed by shaping the anodic plate in such a form and selectively applying an acceleration potential suitable for the particular pair of separated anodes. Moreover, multicolor fluorescent display devices can be obtained by cutting the anodic plate into a desired form, e.g., arrangement of lines or rows of dots or lines, applying the fluorescent screen comprising the zinc oxide-based phosphor of the present invention onto some portions of the separated anode, and applying onto other portions of the anode a fluorescent screen comprising other phosphors which, under excitation of low-velocity electrons, can emit light of a color different from that of the zinc oxide-based phosphor of the present invention.

As is described hereinbefore, in accordance with the present invention, it is possible to provide a phosphor which can emit yellow light of high luminance under excitation of low-velocity electrons. It is also possible to provide a yellow emitting fluorescent display device having the fluorescent screen comprising the aforesaid phosphor.

The present invention will now be described with reference to the examples 1 and 2.

EXAMPLE 1

(1) 1 mole of ZnO and 0.01 moles of AlF$_3$
(2) 1 mole of ZnO and 0.01 moles of GaF$_3$
(3) 1 mole of ZnO and 0.01 moles of InF$_3$
(4) 1 mole of ZnO and 0.01 moles of YF$_3$
(5) 1 mole of ZnO and 0.01 moles of SbF$_3$ By using the aforesaid raw materials (1) to (5), (1) 0.01AlF$_3$.ZnO phosphor, (2) 0.01GaF$_3$.ZnO phosphor, (3) 0.01InF$_3$.ZnO phosphor, (4) 0.01YF$_3$.ZnO phosphor and (5) 0.01SbF$_3$ ZnO phosphor were prepared, respectively, in accordance with the following process.

The raw materials were mixed well by means of a ball mill to obtain a raw material mixture. Then, the raw material mixture obtained was put into a quartz crucible and fired in the air at a temperature of 1000° C. for 2 hours. After the firing, the fired product obtained was washed and dried to obtain the zinc oxide-based phosphor.

Next, five kinds of fluorescent display devices in which the aforesaid five kinds of phosphors were used as fluorescent screens were manufactured in accordance with the following process.

100 mg of the phosphor were dispersed into 100 ml of distilled water by ultrasonic dispersion method to obtain an aqueous dispersion. A 2 cm×1 cm aluminum anodic plate supported on a ceramic base plate was placed in the aqueous dispersion, and the aqueous dispersion was allowed to stand for 30 minutes. Then, the water was removed from the aqueous dispersion, and the resulting coating was dried to form a fluorescent screen. The amount of the phosphor thus applied to the anodic plate was about 5 mg/cm$^2$.

Then, a cathode in the form of a tungsten wire heater covered with an oxide was located being faced to the fluorescent screen on the aluminum anodic plate at the interval of about 5 mm. Then, the pair of electrodes was put in a hard glass container and the container was evacuated. After the pressure within the container reached $10^{-5}$ Torr or so, the evacuation was stopped and the container was sealed. Then, the pressure within the evacuated container was further lowered by sputtering a getter. Thus, a fluorescent display device having the structure as shown in FIG. 1 was obtained.

All of the five kinds of fluorescent display devices manufactured in accordance with the above-mentioned process emitted yellow light of high luminance. The luminance of light emitted by each of the fluorescent display devices with an anodic plate potential of 30 V, 60 V and 90 V are shown in Table 1 below together with the anodic plate potential required to obtain the luminance of 0.1 ft-L.

TABLE 1

| Raw Material | Phosphor | Luminance (ft-L) | | | Anodic Plate Potential For 0.1ft-L (V) |
|---|---|---|---|---|---|
| | | 30V | 60V | 90V | |
| (1) | 0.01AlF$_3$ ZnO | 0.5 | 4.6 | 13 | 15 |
| (2) | 0.01GaF$_3$ ZnO | 13.5 | 71 | 209 | 9 |
| (3) | 0.01InF$_3$ ZnO | 24 | 160 | 450 | 5 |
| (4) | 0.01YF$_3$ ZnO | 18 | 89 | 215 | 7.5 |
| (5) | 0.01SbF$_3$ ZnO | 7.5 | 52 | 145 | 8 |

EXAMPLE 2

(1) 1 mole of ZnO, 0.005 moles of SrF$_2$ and 0.005 moles of GaF$_3$ (2) 1 mole of ZnO, 0.005 moles of SnF$_2$ and 0.005 moles of GaF$_3$ (3) 1 mole of ZnO, 0.005 moles of MgF$_2$ and 0.005 moles of InF$_3$ (4) 1 mole of ZnO, 0.005 moles of SrF$_2$ and 0.005 moles of InF$_3$ (5) 1 mole of ZnO, 0.005 moles of SnF$_2$ and 0.005 moles of InF$_3$ (6) 1 mole of ZnO, 0.005 moles of SrF$_2$ and 0.005 moles of YF$_3$ (7) 1 mole of ZnO, 0.005 moles of SnF$_2$ and 0.005 moles of YF$_3$ By using the aforesaid raw materials (1) to (7), (1) 0.005SrF$_2$.0.005GaF$_3$.ZnO phosphor, (2) 0.005SnF$_2$.0.005GaF$_3$.ZnO phosphor, (3) 0.005MgF$_2$.0.005InF$_3$.ZnO phosphor, (4) 0.005SrF$_2$.0.005InF$_3$.ZnO phosphor, (5) 0.005SnF$_2$.0.005InF$_3$.ZnO phosphor, (6) 0.005SrF$_2$.0.005YF$_3$.ZnO phosphor and (7) 0.005SnF$_2$.0.005YF$_3$.ZnO phosphor were prepared, respectively, in the same manner as in Example 1 except for firing a raw material mixture at a temperature of 1050° C.

Next, seven kinds of fluorescent display devices in which the aforesaid seven kinds of phosphors were used as fluorescent screens were manufactured in the same manner as in Example 1.

All of the seven kinds of fluorescent display device obtained emitted yellow light of high luminance. The luminance of light emitted by each of the fluorescent display devices with an anodic plate potential of 30 V, 60 V and 90 V are shown in Table 2 below together with the anodic plate potential required to obtain the luminance of 0.1 ft-L.

TABLE 2

| Raw Material | Phosphor | Luminance (ft-L) | | | Anodic Plate Potential For 0.1ft-L (V) |
|---|---|---|---|---|---|
| | | 30V | 60V | 90V | |
| (1) | 0.005SrF$_2$ . 0.005GaF$_3$ . ZnO | 12 | 90 | 270 | 6 |
| (2) | 0.005SnF$_2$ . 0.005GaF$_3$ . ZnO | 5.5 | 41 | 90 | 9.5 |
| (3) | 0.005MgF$_2$ . 0.005InF$_3$ . ZnO | 7 | 50 | 150 | 8 |
| (4) | 0.005SrF$_2$ . 0.005InF$_3$ . ZnO | 28 | 200 | 600 | 7 |
| (5) | 0.005SnF$_2$ . 0.005InF$_3$ . ZnO | 12.5 | 90 | 200 | 6 |
| (6) | 0.005SrF$_2$ . 0.005YF$_3$ . ZnO | 21 | 111 | 286 | 7.5 |
| (7) | 0.005SnF$_2$ . 0.005YF$_3$ . ZnO | 9.5 | 50 | 96 | 8 |

We claim:

1. A zinc oxide-based phosphor represented by the formula

$x M^{II} F_2 . y M^{III} F_3 . ZnO$ wherein $M^{II}$ is at least one divalent metal selected from the group consisting of beryllium, magnesium, calcium, strontium, barium, zinc and tin; $M^{III}$ is at least one trivalent metal selected from the group consisting of aluminum, gallium, indium, thallium, yttrium and antimony; and x and y are numbers satisfying the conditions of $0.0001 \leq x+y \leq 0.1$, $0 \leq x$ and $0 < y$; said phosphor emitting yellow light when excited by low velocity electrons.

2. A zinc oxide-based phosphor as defined in claim 1 wherein said x and y are numbers satisfying the condition of $0.001 \leq x+y \leq 0.03$.

3. A low-velocity electron excited fluorescent display device having a fluorescent screen comprising a zinc oxide-based phosphor represented by the formula

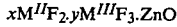

$x M^{II} F_2 . y M^{III} F_3 . ZnO$ wherein $M^{II}$ is at least one divalent metal selected from the group consisting of beryllium, magnesium, calcium, strontium, barium, zinc and tin; $M^{III}$ is at least one trivalent metal selected from the group consisting of aluminum, gallium, indium, thallium, yttrium and antimony; and x and y are numbers satisfying the conditions of $0.0001 \leq x+y \leq 0.1$, $0 \leq x$ and $0 < y$ wherein said display device is a display tube comprising an anodic plate carrying on one face thereof said fluorescent screen and a cathode disposed opposite to said screen, said anodic plate and cathode being provided in a sealed evacuated tube, and wherein said phosphor emits yellow light when excited by low velocity electrons.

4. A low-velocity electron excited fluorescent display device as defined in claim 3 wherein said x and y are numbers satisfying the condition of $0.001 \leq x+y \leq 0.03$.

* * * * *